Patented Jan. 29, 1946

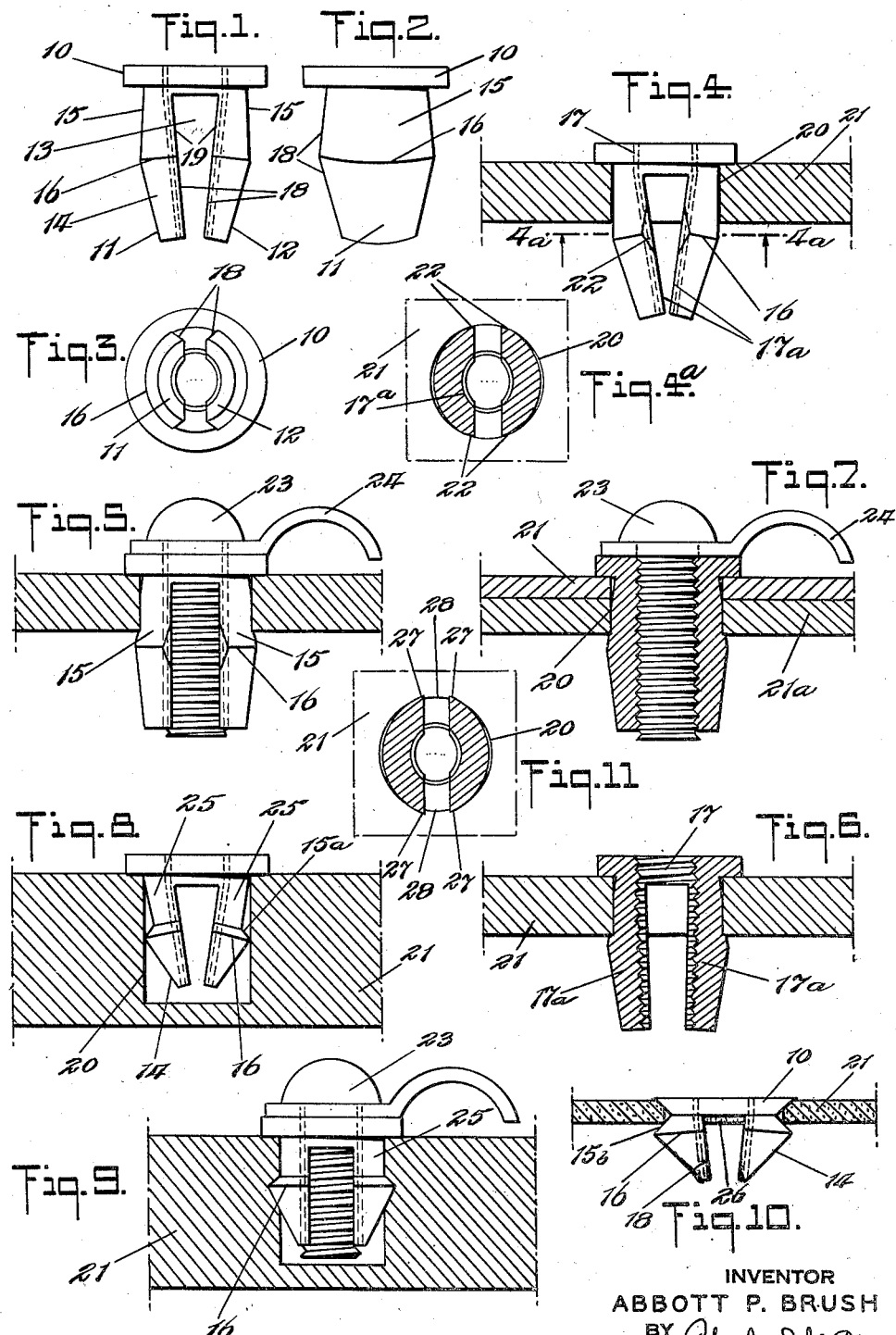

2,393,606

UNITED STATES PATENT OFFICE 2,393,606

TAPPED FASTENER

Abbott P. Brush, Greenwich, Conn.

Application June 19, 1944, Serial No. 541,074

2 Claims. (Cl. 85—2.4)

The invention here disclosed relates to the provision of tapped holes in various kinds of materials.

Special objects of the invention are to provide a simple one piece structure, which may be driven into place and which in the act of driving, will secure itself both against rotation and withdrawal and will then form a seat for securely holding an inserted screw.

Other objects and the novel features by which all purposes of the invention are attained, will appear or are set forth in the course of the following specification.

The drawing accompanying and forming part of the specification illustrates certain present commercial embodiments of the invention, but structure may be modified and changed all within the true intent and broad scope of the invention as hereinafter defined and claimed.

Fig. 1 in the drawing is an edge view of one of the screw seat forming inserts.

Fig. 2 is a side view of the same.

Fig. 3 is an end view.

Fig. 4 is a view showing the insert driven into the interlocked position in a sheet of material, the latter appearing in section. Fig. 4a is a cross-section on line 4a—4a of Fig. 4.

Fig. 5 is a similar view showing a screw entered in the insert and holding a wire clamp or other supported object.

Fig. 6 is a similar view with the insert appearing in section and the screw removed.

Fig. 7 is a view similar to Fig. 5, but showing the insert serving also as a rivet for securing two layers of material together.

Fig. 8 is a view of another form of insert entered in an opening in a piece of plastic or like material and Fig. 9 is a view of these same parts showing the screw entered in the insert.

Fig. 10 is a part sectional view illustrating a form of insert for thin sheet material.

Fig. 11 is a cross-sectional detail on a plane similar to that taken on the line 4a—4a of Fig. 4, but illustrating the action where the insert is harder than the material through which it is forced and in which action the sharp edges cut key grooves and lugs in the surrounding material.

In the form of the invention shown in Figs. 1, 2 and 3, the insert is in the nature of a tubular stud having an annular head 10, and a projecting split tubular shank made up of convergently disposed segments 11, 12, separated by a slot 13.

Externally the shank segments are tapered in opposite directions, providing oppositely conical portions 14, 15, faced toward the end of the shank and toward the head and leaving oppositely inclined circular ridges 16. These ridges as particularly appears in Fig. 1, converge inwardly toward the axis and toward the head of the stud.

The head portion has a substantially cylindrical screw-threaded passage 17, therethrough and the inner opposing faces of the convergently inclined shank segments carry continuing portions 17a of this same screw-threaded passage but inclined toward each other, substantially in accordance with the inward incline of the shank segments.

In commercial practice, the tubular studs may be internally screw-threaded full length, the stem portion turned down with oppositely extending tapers 14, 15, and split with a parallel-sided slot, after which the separated segments may be squeezed toward each other, more or less to the extent indicated in Fig. 1. This provides sharp bevelled cutting edges along the edges of the slot at 18, Fig. 2, inclining outwardly to the large diameter ridge 16, and then inclining inwardly at 19, from the ridge toward the head.

When the insert is driven into a hole 20, Fig. 4, of less diameter than the ridged portion, in material 21, which is harder or softer than the insert, the relatively sharp edges at 18, 19, will cut their way more or less, or on the other hand, be somewhat blunted or flattened as indicated at 22, in either event, to key and hold the insert against rotation in or removal from the hole.

The insert may be forced or driven into its fully seated relation, Fig. 4, by a hammer or like instrument, and when so forced into and partly through the smaller size opening, with the convergently inclined ridges 16, at the inner side of the material, it is firmly interlocked and held against any ordinary forces of removal or rotation and remains so held, in the partially collapsed condition, substantially as illustrated. The cutting or swaging action of the sharp edges along the opposite sides of the slot, in the driving into a relatively softer or harder material, accomplishes a more or less permanent interlock which will prevent a properly seated insert from shaking or working loose and hence these inserts may be entered at any time, even though it be known that the screws for which they are intended, will not be applied for some much later time.

These inserts do not require the use of any special screws. They are adapted to serve for any ordinary screws and particularly because of the fact that a screw, such as represented at 28, will engage first in the substantially cylindrical screw passage 17, in the head and thus gain a firm hold in the head before encountering the relatively inclined or tapered portion of the screw passage formed by the convergent sections 17a of the screw passage. Then the screw engaging these inclined portions will force the split shank segments apart and into more firmly seated engagement in the material. In this action, the upper bevels or tapers 15, act as wedges to pull the stud down as far as the head will permit into fully seated engagement in the material. Hence, the effect is to actually clamp the material between the head and the inclined ridged portions of the split shank.

Figs. 5 and 7 show how a wire clamp or other support or device 24, may be caught and held beneath the head of the screw, and Fig. 7 shows how the opening 20 may be formed in two or more layers of material, such as 21, 21a, so that the insert will then act also as a rivet for clamping the layers together.

When the screw is removed, the split portions of the shank may collapse somewhat as indicated in Fig. 6, but the insert will remain firmly keyed and interlocked in place, ready to receive the screw when again inserted.

In driving the insert into an opening of smaller diameter than the maximum diameter at the ridge or shoulder 16, the sides of the split shank will be squeezed together or toward each other as in Fig. 4, to act as a wedge, which will center the device in the hole and which having the inclined sharp edges at 18, 18, Fig. 2, will key itself against turning in the opening. If the material is softer or not any harder than the material of the insert, then these sharp edges will cut tapered keyways 27, Fig. 11, in opposite edges of the hole, leaving between them the diametrically opposite keys 28. In this action, the edges may be flattened down somewhat and if, as heretofore explained, the material is harder than the insert, the edges may be flattened down as indicated at 22, in Figs. 4 and 4a, but in such flattening down, sufficient keying effect will be obtained to enable the insert to hold against turning when a screw is inserted or removed. The end view, Fig. 3, illustrates this wedge-like character of the split shank, it being noted that the partly collapsed condition of the shank segments converts the entering end of the stud into a substantially elliptical cross-sectional shape, in contrast to the substantially circular head portion of the article.

The stud may be made in different materials and be used in different materials and in different thicknesses of materials. It may be used in materials heretofore considered too thin to support such a device, for example, in thin sheet Celluloid, plastics, cardboard and the like.

The opening in which the insert is engaged need not extend all the way through the material. In Figs. 8 and 9, a relatively thick layer of material is indicated in which the opening does not extend all the way through. This might be considered, for example, a panel of a "Bakelite" compound or other material softer than the insert in which event the sharp wedge-like side edges of the insert would cut opposing keyways in the sides of the opening.

When so used a modified form of the insert may be employed having, as shown in Fig. 8, a relatively short and more abrupt bevel 15a above the ridge or shoulder 16, and above that, substantially cylindrical neck portions 25. Also in this particular form the lower taper 14 is more abrupt, with the result that the ridge 16 presents a sharper edge and thus is adapted to better force its way into the surrounding material Fig. 9 when the screw is entered.

In wedging the split shank segments apart the screw is gripped and more firmly held the further it enters the insert and, as the split segments engage both faces of the threads on the screw, the screw is held as in a lock nut.

Depending upon the particular use to which it is to be put, the insert may be made in such materials as steel, aluminum, brass or plastics and these materials may be selected to provide a certain amount of springiness in the split sides of the stem.

The length of the split shank and the inclinations of the oppositely tapered portions of the stem may be varied in accordance with the nature and the thickness of the material in which the insert is to be used. For example, to hold in thin material, such as Celluloid or sheet plastic, a short aluminum stud may be used having relatively abrupt opposite tapers, such as indicated in Fig. 10, which will pass readily through the material and then firmly clamp the thin material between the upper conical portion 15b and the head 10. In this view, one of the keyways cut by the inclined sharp wedge-like edges 18 is indicated at 26.

Whether the stud is formed in the partly collapsed condition illustrated in Fig. 1, or is shaped to that form by driving it into the material, it remains in this partially collapsed condition and holds itself against turning in or removal from the hole by reason of this distorted or collapsed condition.

The shape of the head may vary to suit different requirements. Thus as first shown, it may be in flat annular form, or, as indicated in Fig. 10, it may be tapered to fit in a tapered countersunk opening or to seat to a self-adjusting extent in the opening in the material.

While for general purposes it is preferred to cut a single slot across the double conical tubular shank and to terminate this slot short of the head portion, for some purposes the slot may be cut through only one side of the tubular insert and be extended continuously from one end to the other, that is, through the head as well as through the shank portion of the device. This construction, the subject matter of a separate, divisional application for patent, permits of a collapsing action the full length of the element as it is driven or forced into the hole.

What is claimed is:

1. Means providing a screw fastening in an ordinary drilled hole and by a simple hammering operation and comprising, in combination with a support having a drilled or other circular hole, a tubular stud driven in said hole and having a head at the outer end limiting the extent to which said stud is driven into the hole and having a split shank anchoring the stud in and locking it against turning in the hole, said split shank having a conical end portion tapered to admit entry of the shank into the hole and a reversely conical portion tapered toward the head, said reversely tapered conical portions meeting on a sharply defined ridge intermediate the length of the shank and inclined reversely toward the opposite ends of the stud, said ridge being of larger diameter than the diameter of the hole and the conical portion faced toward the head tapering from a maximum diameter greater than that of the hole to a minimum diameter of approximately the diameter of the hole, said tubular shank being slotted inwardly from the end of the same substantially to the head portion and thereby separated into opposed segments having maximum dimensions at said ridge greater than the diameter of the hole whereby in driving the stud the segments may be collapsed by the walls of the hole to an external diameter across the slot approximately equal to the diameter of the hole but the dimensions at the ridged portions even in said partially collapsed condition being greater than the diameter of the hole, so that in driving, the edges of the segments at the slot, leading from the end to said ridged portions will act as sharp inclined cutters to wedge, bind or cut into the surrounding confining wall of the hole and said confining wall in the finally seated position of the stud having keying portions formed by the driving of said larger diameter cutting edge portions of the shank segments cooperating with said shank segments to resist turning of the stud in its driven seated engagement in the hole, said stud having a circular screw threaded passage through the head portion of the same and the partially collapsed shank segments having continuations of said same screw passage on the opposing inner faces of the same and a screw entered in said circular screw passage of the head and engaged with said continuing portions of the same on the inner faces of the shank segments and whereby said screw in tending to expand said partially collapsed shank segments, will force the inclined ridge portions of the segments more firmly in engagement with the walls of the hole and in turn be clamped and held by said shank segments.

2. A hammer driven, self-securing screw seat forming insert adapted to be anchored and secured against rotation in a circular hole by a simple driving operation and comprising, a tubular stud having a head at one end for limiting the extent to which it may be driven and a split tubular shank for anchoring and holding it against rotation, said shank having a beveled, conical, tapered end portion for entry in the hole and an oppositely beveled, conical portion tapered toward the head, said oppositely tapered, beveled, conical portions meeting intermediate the length of the shank in a sharply defined annular ridge inclined toward opposite ends of the shank, said tubular shank being slotted inwardly from the end of the same substantially to said head portion and thereby separated into opposed segments, said stud having a circular screw threaded passage through the head portion of the same and continuations of said same screw passage on the opposing inner faces of the separated shank segments and said separated shank segments being partially collapsed toward each other with the portions which are beveled toward the head in substantial parallelism on a diameter across the slot and with the sharply defined ridge portions at opposite sides of the slot inclined convergently toward the head portion to aid in centering and holding the stud against rotation during the driving operation.

ABBOTT P. BRUSH.